US008934887B2

(12) United States Patent
Dgani et al.

(10) Patent No.: US 8,934,887 B2
(45) Date of Patent: Jan. 13, 2015

(54) SYSTEM AND METHOD FOR RUNNING MOBILE DEVICES IN THE CLOUD

(75) Inventors: Moshe Dgani, Holon (IL); Moshe Levy, Hod Hasharon (IL); Zvi Shmilovici, Tel-Aviv (IL)

(73) Assignee: Emblaze Ltd., Ra'anana (IL)

( * ) Notice: Subject to any disclaimer, the term of this patent is extended or adjusted under 35 U.S.C. 154(b) by 17 days.

(21) Appl. No.: 13/606,675

(22) Filed: Sep. 7, 2012

(65) Prior Publication Data
US 2013/0324099 A1 Dec. 5, 2013

Related U.S. Application Data

(60) Provisional application No. 61/653,819, filed on May 31, 2012.

(51) Int. Cl.
*H04M 3/00* (2006.01)
*G06F 13/10* (2006.01)
*C08L 97/02* (2006.01)

(52) U.S. Cl.
CPC ............ *G06F 13/107* (2013.01); *C08L 97/02* (2013.01); *Y02B 60/50* (2013.01)
USPC ............. 455/419; 455/418; 455/420; 703/13; 703/21; 703/23; 703/24

(58) Field of Classification Search
CPC ...................................................... H04W 8/245
USPC ........ 455/418–420, 550.1, 554.2, 555, 556.1, 455/556.2, 557, 558, 559; 703/13–28
See application file for complete search history.

(56) References Cited

U.S. PATENT DOCUMENTS

| | | | |
|---|---|---|---|
| 7,127,705 B2 | 10/2006 | Christfort et al. | |
| 8,060,074 B2 | 11/2011 | Danford et al. | |
| 8,165,558 B2 | 4/2012 | Cook et al. | |
| 8,345,768 B1* | 1/2013 | Hobbs et al. | 375/240.24 |
| 2009/0036111 A1* | 2/2009 | Danford et al. | 455/419 |
| 2010/0131966 A1 | 5/2010 | Coleman et al. | |
| 2010/0146504 A1 | 6/2010 | Tang | |
| 2010/0304860 A1* | 12/2010 | Gault et al. | 463/31 |
| 2010/0306813 A1* | 12/2010 | Perry et al. | 725/114 |
| 2010/0333088 A1 | 12/2010 | Rogel et al. | |
| 2011/0093567 A1 | 4/2011 | Jeon et al. | |
| 2011/0161404 A1 | 6/2011 | Ekstrom et al. | |
| 2011/0252071 A1 | 10/2011 | Cidon | |
| 2011/0302302 A1 | 12/2011 | Min et al. | |
| 2013/0013671 A1* | 1/2013 | Relan et al. | 709/203 |

FOREIGN PATENT DOCUMENTS

| | | |
|---|---|---|
| CN | 10 2404395 | 4/2012 |
| CN | 20 2205234 | 4/2012 |

\* cited by examiner

*Primary Examiner* — Magdi Elhag
(74) *Attorney, Agent, or Firm* — Cozen O'Connor

(57) ABSTRACT

Systems and methods comprise a network in which a mobile device is configured as an input/output interface for a user such that actual processing, storage and network interfaces are performed or provided by a remote server.

28 Claims, 13 Drawing Sheets

SYSTEM AND METHOD FOR RUNNING MOBILE DEVICES IN THE CLOUD

CROSS-REFERENCE TO RELATED APPLICATION

This application claims the benefit of U.S. Provisional Application No. 61/653,819, filed May 31, 2012.

BACKGROUND

1. Field of Disclosure

Example embodiments are related to systems and methods for running mobile device hardware and software in the cloud and, in particular, to systems and methods in which a mobile device acts as an input/output interface for a user, and actual processing, storage and network interfaces are performed by a remote server.

2. Description of Related Art

Operating systems (OS's) and applications, i.e., software (SW), for mobile devices continue to develop to provide richer functionality and user interface experiences, and are thus becoming larger, more complex and more performance hungry. Mobile device hardware (HW) requirements for OS's and applications are becoming more demanding in terms of central processing unit (CPU) and graphic processing unit (GPU) capabilities, memory sizes and power dissipation. The current generation of mobile devices (e.g., smartphones, tablets and laptops) is based on high performance HW, namely a high speed multi-core CPU and GPU, a large run time memory (e.g., dynamic random-access memory (DRAM)) and a large storage size (e.g., Flash memory storage). As the HW requirements for executing or running OS's and applications become more demanding, HW costs for mobile devices increase. Moreover, changes in mobile device performance may lead users to frequently change their mobile device.

Another trend in mobile device technology is the frequent change in OS versions (e.g., Google's Android OS has versions 2.x, 3.x, 4.x . . . ) and the different types of OS's (e.g., Google's Android, Microsoft's Windows Mobile, Nokia's Symbian and Apple's iOS) on the market that require effectively different HW. When a new OS version is released, mobile device vendors cannot always upgrade each of the different mobile devices in their product line with the new OS version due to the large amount of time and effort needed to develop and test an upgrade path for each different device type. Mobile device manufacturers address different market segments by designing and manufacturing many mobile device variants, each with different HW capabilities and accompanying OS and applications tailored to the HW capabilities. This wide variety of devices often confuses customers and results in a large burden on the manufacturers for maintaining multiple SW versions.

FIG. 1 shows a conventional SW stack on a conventional mobile device. A conventional mobile device is a stand-alone entity in which the entire SW stack executes on the HW of the mobile device itself. A conventional SW Stack includes a HW abstraction layer (e.g., Kernel, drivers etc.) executing directly on the mobile device HW, an OS and applications executing on top of the OS. The performance of a conventional mobile device is related to the HW capabilities of the mobile device. A network provides voice calls and a data connection, for example, a data connection for web surfing, e-mails, application downloads etc., to a conventional mobile device.

U.S. Pub. No. 2011/0161404 discloses a server implemented method for communicating data between a server and a first device. The method, however, does not communicate different data in different streams or provide for multiple versions, types or instances of a mobile OS at the server.

U.S. Pat. No. 8,165,558 discloses a "trans" client which does not contain its own user interface (UI) and operating system (OS) has no capability to run user programs as a standalone apparatus. The trans client, however, is for operation with a smart cellular telephone as its server.

U.S. Pub. No. 2011/0252071 discloses a method for managing a virtual distributed filed system, but is unrelated to emulation of a mobile device OS at a server.

U.S. Pub. No. 2010/0146504 discloses a virtual mobile infrastructure (VMI) and its base platform. The host OS, however, requires a QEMU process and a VM switch to virtualize at least one guest cell phone operating system.

SUMMARY

Example embodiments provide systems and methods for decoupling mobile device HW capabilities from actual mobile device performance and a user experience, which enables upgrading mobile device functionality, performance, OS and applications without the need to change the HW or the local SW of the mobile device itself.

According to an example embodiment, a method for operating a mobile device comprises executing, by a mobile device, a basic software (SW) protocol or operating system (OS) to receive input information from one or more hardware (HW) components of the mobile device, establish a network connection to a server, and send the input information to the server over the network connection without performing more detailed processing of the input information by the mobile device. The mobile device receives at least one data stream from the server. The mobile device produces at least one of a display, audio and a HW action by a HW component of the mobile device from the at least one data stream.

According to another example embodiment, a method for operating a mobile device comprises receiving, by a mobile device, a plurality of different types of data from one or more hardware (HW) components of the mobile device. The mobile device sends each different type of data to a server in a separate data stream. The mobile device receives user interface information from the server. The mobile device produces at least one of a display, audio and a HW action of a HW component of the mobile device based on the user interface information.

According to still another example embodiment, a method for operating a mobile device comprises receiving, by a mobile device, input information from one or more hardware (HW) components of the mobile device. The mobile device sends the input information to a server. The mobile device receives a plurality of separate data streams from the server, each of said plurality of separate data streams comprising a different type of data. The mobile device integrates the data from each the separate streams together. The mobile device produces a display, audio and a HW action by a HW component of the mobile device from the integrated data.

According to an example embodiment, a method for operating a mobile device comprises operating a mobile device in a first mode by and operating a mobile device in a second mode separate from the first mode. In the first mode, the mobile device executes a basic software (SW) protocol or operating system (OS) to receive input information from one or more hardware (HW) components of the mobile device, establish a network connection to a server, and send the input information to the server over the network connection, receives at least one data stream from the server, and produces at least one of a display, audio and a HW action of a HW component of the mobile device based on the at least one data stream. In the second mode, the mobile device receives the input information from the one or more HW components of the mobile device, processes, by the basic SW protocol or OS of the mobile device, the input information to produce user interface information for reproducing at least one of a display, audio and a HW action by a HW component of the mobile device, and produces the at least one of the display, the audio and the HW action of the HW component of the mobile device based on the user interface information.

According to another example embodiment, a method for emulating a mobile device at a server comprises receiving, by a server, input information from at least one mobile device, wherein the input information has not been processed to produce a display, audio and a hardware (HW) action by a HW component of a mobile device. The server processes, by a mobile device operating system (OS) executed by the server, the input information to produce user interface information for reproducing at least one of the display, the audio and the hardware (HW) action by the HW component of the mobile device. The server sends the user interface information to the mobile device.

According to still another example embodiment, a method for emulating a mobile device at a server comprises receiving, by a server, input information from at least one mobile device, wherein the input information has not been processed to produce a display, audio and a hardware (HW) action by a HW component of a mobile device. The server processes, by a mobile device operating system (OS) executed by the server, the input information to produce user interface information for reproducing at least one of the display, the audio and the hardware (HW) action by the HW component of the mobile device. The server sends the user interface information to the mobile device.

According to an example embodiment, a method for emulating a mobile device at a server comprises receiving, by a server, input information from a plurality of different mobile devices. The server processes, by a same instance of a mobile device operating system (OS) executed by the server, the input information from each of the plurality of different mobile devices to produce user interface information for reproducing at least one of a display, audio and a HW action by a HW component of the mobile device. The server sends the user interface information to at least one of the plurality of different mobile devices.

According to another example embodiment, a method for emulating a mobile device at a server comprises receiving, by a server, first input information from a mobile device. The server processes, by a first mobile device operating system (OS) executed by the server, the first input information to produce first user interface information for reproducing at least one of a display, audio and a hardware (HW) action by a HW component of the mobile device. The server sends the first user interface information to the mobile device. The server receives second input information from the mobile device. The server processes, by a second mobile device operating system (OS) executed by the server, the second input information to produce second user interface information for reproducing at least one of a display, audio and a HW action by a HW component of the mobile device, wherein the second mobile device OS has at least one of a different OS type, a different OS version and a different OS instance than the first mobile device OS. The server sends the second user interface information to the mobile device.

BRIEF DESCRIPTION OF THE DRAWING FIGURES

These and other objects, features and advantages will be apparent from a consideration of the following Detailed Description of Example Embodiments considered in conjunction with the drawing Figures, in which.

DETAILED DESCRIPTION OF EXAMPLE EMBODIMENTS

Systems and methods according to example embodiments comprise a network in which a mobile device acts as an input/output interface for a user such that actual processing, storage and network interfaces are performed or provided by a remote server.

Figure 1:
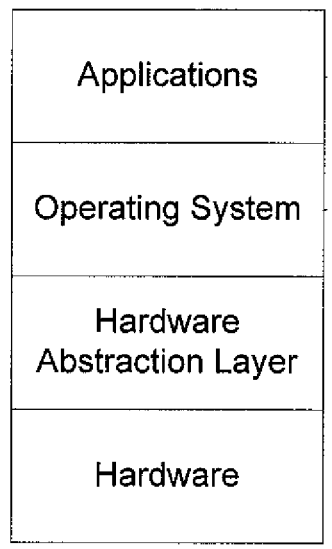
FIG. 1 shows a conventional software (SW) stack on a conventional mobile device.
Figure 2:
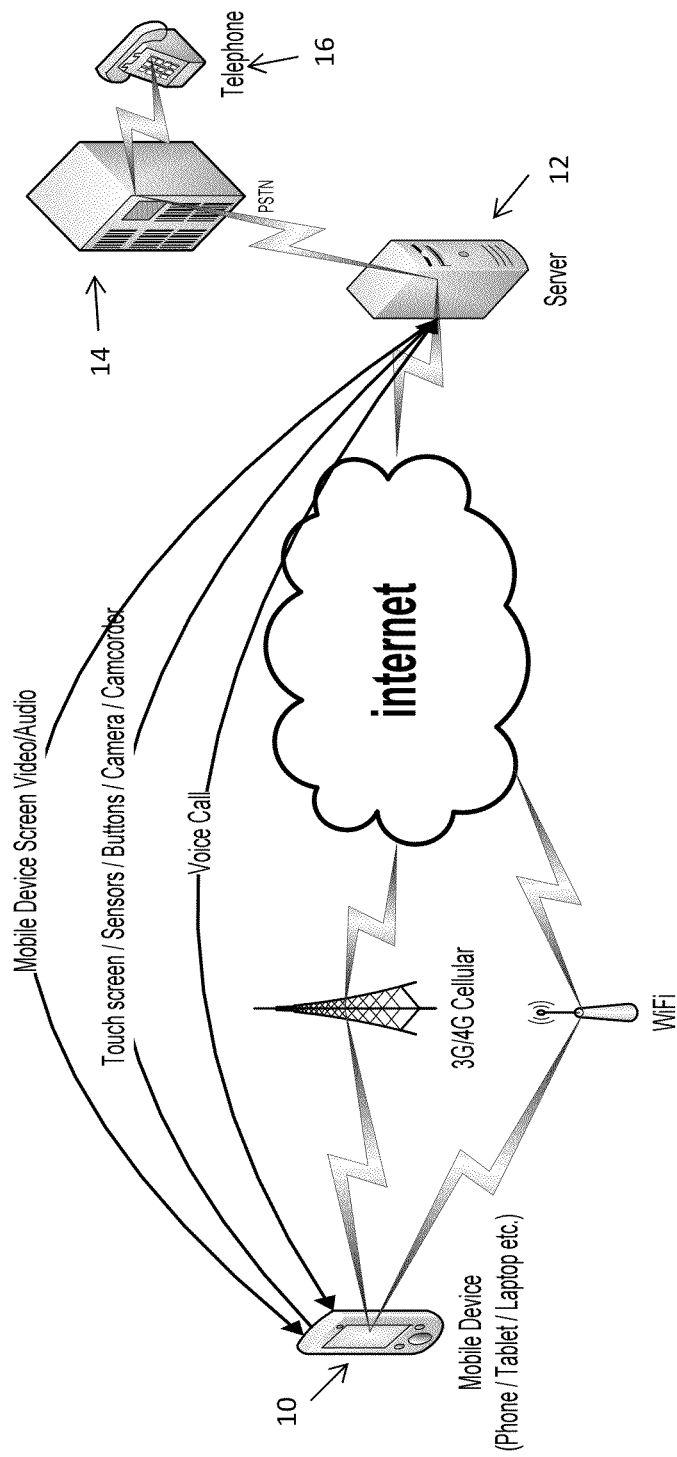
FIG. 2 shows an end-to-end network system according to an example embodiment.

FIG. 2 shows an end-to-end network system according to an example embodiment. A mobile device 10 is connected through a wireless network, e.g., WiFi or 3G/4G cellular, and/or the Internet to a server 12. The mobile device 10 comprises a processor, a memory, input components (e.g., a touch screen, buttons, sensors, a camera, Bluetooth, etc.), a display, a speaker and at least one wireless transmitter/receiver. Components and functionality of the mobile device 10 are described in more detail below. The server may be an x86 Linux based server.

The mobile device 10 is configured to minor to the server 12 all or a portion of information input to the mobile device 10. That is, the mobile device 10 receives input information from the input components and sends the input information to the server 12 for processing by the server 12. The mobile device 10 (i.e., the hardware (HW) and local software (SW) of the mobile device 10) thus does not perform the processing locally at the mobile device 10 itself. For example, the mobile device 10 may mirror input information including touch screen gestures, pressed buttons, sensor data, audio data and video data to the server 12 over a packet based network, and the server 12 processes the input information to produce a display and/or audio output based on the input information. That is, the server 12 executes a mobile device operating system (OS) (e.g., Google Android 4.1 or Windows phone 8)

and one or more applications (e.g., a Game or GPS navigation SW) on emulated mobile device HW based on the input information received from the mobile device 10. The server streams all animations and/or graphics changes, e.g., changes in games, web browsing and scrolling screens that occur on the virtual mobile device of the mobile OS and emulated HW, to the mobile device 10 as a stream of user interface information. The user interface information is data that can be used to recreate or produce a display and/or audio without any processing thereof other than the decoding and playback or reproduction of the user interface information itself by the mobile device 10. For example, the user interface information may be information representing a touch screen gesture to zoom in on a web page, and the information representing the gesture is sent from mobile device 10 toward server 12. The server 12 zooms in locally on the web page, i.e., by execution of the mobile device OS, and sends back toward mobile device 10 a stream of data including all of the web page zooming display information changing over time. For example, the stream of data is similar to a video stream which when reproduced by the mobile device 10 enables the mobile device 10 to display the zooming in on the web page without the mobile device 10 itself performing any of the processing associated with the zooming function. A display and/or audio output of the virtual mobile device is thus constantly streamed to the mobile device 10 and reproduced thereon without the mobile device 10 being required to perform any of the processing for changes to the display and audio output.

The server 12 emulates mobile device HW and executes or runs a mobile device OS and applications on the emulated HW to processes the input information received from the mobile device 10 (i.e., the mirrored input). That is, the server 12 executes an OS and one or more applications on emulated mobile device HW based on the input information received from the mobile device 10. For example, the server 12 processes the input information received from the mobile device 10 and produces user interface information including information for producing a display, audio and other feedback. The server 12 encapsulates the user interface information into data packets and sends the encapsulated user interface information to the mobile device 10, and the mobile device 10 produces a display and/or audio output based on the data sent by the server 12. The server 12 may be further configured to act as a mobile device gateway for handling and providing internet access, voice calls and a gateway to a public switched telephone network (PSTN) 14 and one or more PSTN telephones 16.

Figure 3:
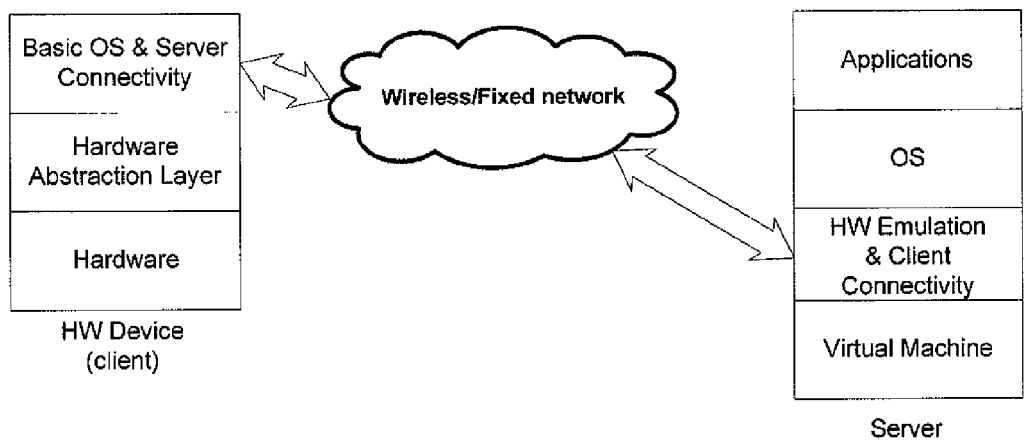
FIG. 3 shows an example system solution SW stack separated between a mobile device and a server according to an example embodiment.

FIG. 3 shows an example system solution SW stack separated between a mobile device and a server. Main SW (i.e., a mobile OS and applications) is executed on the server 12 on a server side. The mobile device 10 on a mobile device side executes only basic SW (e.g., a more basic OS or a simple SW protocol without an OS) which is required for basic functionality of the mobile device 10 before a network connection of the mobile device 10 to the server 12 executing the mobile OS and applications is achieved. Accordingly, the basic OS/simple SW executing on the mobile device 10 may be a different (and much simpler) OS or software protocol than the mobile OS executing on the server 12. The basic SW on the mobile device 10 is connected to the mobile SW on the server 12 by a wireless/fixed network.

The basic SW executing on the mobile device 10 may be a server-to-client protocol which implements all of the basic functionality of the mobile device 10, e.g., battery monitoring, wireless network connectivity, power on/off and SW upgrade functionality. The basic SW may not be capable locally, i.e., without network connectivity to the mobile device OS executing on the server 12, of running applications and local user storage. Conventional methods for virtualizing PC desktops over the Cloud are not suitable for a modern mobile devices which typically have many more capabilities than a conventional PC desktop. An end-to-end network system according to example embodiments provides for virtualized support of touch, multi-touch and gesture based interfaces, various sensors, GPS and Glonass type systems, seamless virtualized support of camera and camcorder functions, the ability for the mobile device 10 to user different virtualized OS's at the server 12, the ability for multiple different mobile devices 10 to use the same instance of a virtual machine, an optimized client-to-server protocol that functions on wireless networks having relatively low bandwidth and high bit error rate, the ability to pass in real time and high quality display graphics motions, e.g., menu scrolling, game action and videos, and the ability to perform voice calling or send a SMS seamlessly without the need to operate dedicated SW such as Skype which requires a logon procedure for its members.

Figure 4:
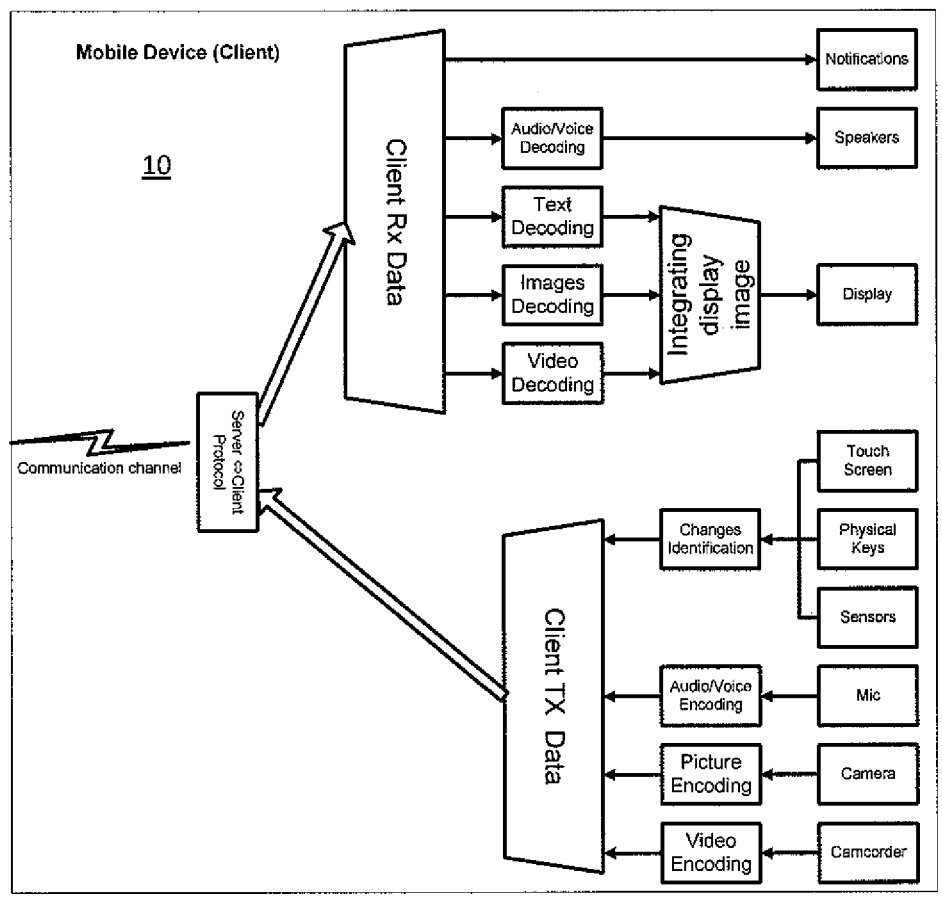
FIG. 4 is a block diagram of mobile device components and functionality according to an example embodiment.

FIG. 4 is a block diagram of mobile device components and functionality according to an example embodiment. The mobile device 10 comprises HW and SW including an input/output interface toward the user including a display and video (e.g., H.264 and VP8 Video encoding/decoding may be used), image and text decoding (e.g., JPEG image encoding/decoding may be used), an integrating unit for integrating video, image and text data into display data for producing a display/user interface, a speaker and audio/voice decoding (e.g., the OPUS codec may be used for audio/voice encoding/decoding), a notification output unit, a microphone and audio/voice encoding, a camera and/or a camcorder and video and/or picture encoding, a touch screen, one or more physical "hard-key" and/or "soft-key" buttons, a keyboard, various sensors including one or more motion sensors, e.g., accelerometers, gravity sensors, gyroscopes and rotational vector sensors, one or more environmental sensors, e.g., ambient temperature, pressure, illumination and humidity sensors, and one or more position sensors, e.g., orientation sensors, magnetometers, Bluetooth and GPS, a change identification unit for identifying changes to the input components and sensors to produce the input information, external hardware interfaces including USB, Headphone, Bluetooth and Near Field Communication (NFC) interfaces, wireless network connectivity including WiFi and cellular network transmitters/receivers and processing associated therewith. Decoding, encoding, integrating and identification processes may be hardware or software based implementations The basic OS or SW protocol executing on the mobile device 10 is configured to activate the above-described HW/input components of the mobile device 10 and receive information (or detect changes) input thereto, as well as to establish a network connection to the server 12. However, the basic OS or SW protocol executing on the mobile device is not required to perform more detailed processing of the information or detected changes received from the HW of the mobile device 10. That is, the mobile device 10 does not process the input information or detected changes to produce changes in a display or audio output of the mobile device 10. The mobile device 10 instead minors the information or changes input to the HW components of the mobile device 10 to the server 12 over the network connection. The server 12 processes the mirrored information and mirrors the emulated user interface information (e.g., display and speaker audio) back to the mobile device 10. The mobile device 10 produces the display, speaker audio and/or a HW action of a hardware component (e.g., activates and/or controls a GPS and/or one or more sensors) based on the mirrored emulated user interface information.

The input information from the user interface received by the mobile device 10 is sent from the mobile device 10 to the server 12 without any manipulation/processing thereof, except for optional data compression. For example, if a user touches the touch screen of the mobile device 10 in a specific area, the change identification unit identifies the change in input to the touch screen, e.g., coordinates of the specific area touched by the user, and the mobile device 10 sends the coordinates of the specific area to the server 12. If the area touched by the user changes, new coordinates for the new area now touched by the user are identified by the change identification unit and are sent to the server 12 by the mobile device 10. If the user releases his touch from the touch screen, the change identification unit identifies the change in input to the touch screen and the mobile device 10 sends a touch screen release message to the server 12. The user interface input components of the mobile device 10, e.g., the microphone and camera, sample audio and/or video input thereto, and the corresponding audio/video/picture encoding encodes the sampled input for transmission. The mobile device 10 sends the encoded/sampled audio and/or video data encapsulated into packets toward server 12.

The mobile device 10 implements basic functionality through the basic OS or SW protocol executing on the mobile device HW. The basic functionality of the mobile device 10 comprises powering up of the mobile device 10, monitoring battery power of the mobile device 10, upgrading the SW (e.g., the basic OS) of the mobile device 10, connecting the mobile device 10 to a WiFi network or a cellular network (which may be user configurable), unique identification of the mobile device 10 to the network and/or a local operator, and setting and negotiating HW capabilities (e.g., display resolution and size, sensor capabilities etc. . . . ) of the mobile device 10.

The basic functionality of the mobile device 10 further comprises receiving, identifying and encapsulating information input or changes made to a user interface (touch screen, physical keys, etc.) into messages/data streams for transmittal to the server 12, receiving, identifying and encapsulating HW sensor data and/or changes thereto into messages/data streams for transmittal to the server 12 (sensors include motion, environmental and position sensors), receiving, encoding (e.g., compression) and encapsulating camera and/or camcorder (e.g., picture and/or video data) and/or microphone (audio data) information and sending the encoded and encapsulated information to the server 12 (encoding may include compression performed to save network bandwidth). The basic functionality of the mobile device 10 further comprises intensive processing tasks, e.g., encoding/decoding of video, which may be accelerated by HW of the mobile device 10, notifications (receiving at the mobile device 10 from the server 12 notifications of new events and reporting them to the user (e.g., a telephone call, a new E-mail, a new SMS, etc. . . . )) and server-to-client protocol for decoding video, audio, image and text data (user interface information) separately streamed from the server 12 to the mobile device 10, integration of the video, image and/or text data into display data for producing a display and reproduction thereof by the display screen with reproduction of audio data by the speaker.

The mobile device 10 sends each type of data (e.g., voice, audio, image, video, notification, sensor, etc.) to the server 12 in a separate stream. Similarly, the mobile device 10 receives from the server 12 a separate stream for each type of data and, as shown in FIG. 4, a server-to-client protocol of the mobile device 10 sends the data from the individual streams to the appropriate decoding component, which can be implemented by either HW or SW), of the mobile device 10.

Figure 5:
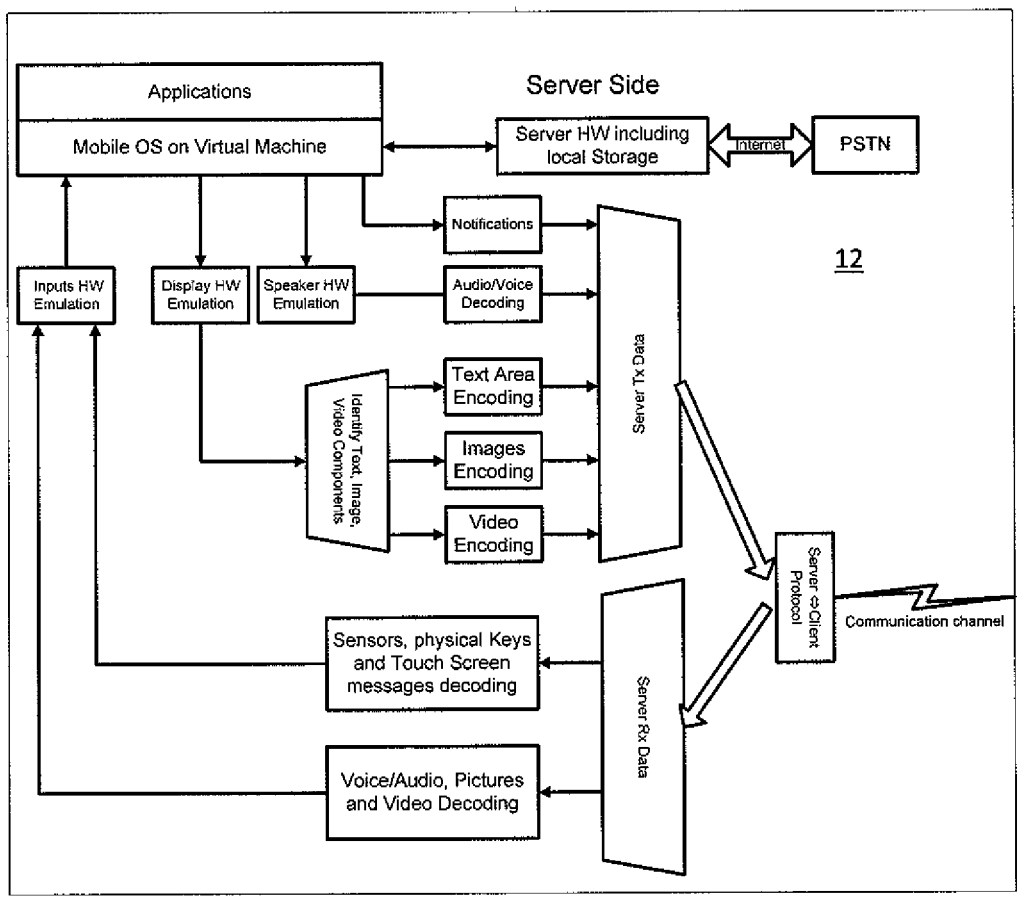
FIG. 5 is a block diagram of server components and functionality according to an example embodiment.

FIG. 5 is a block diagram of server components and functionality according to an example embodiment. The server 12 may comprise a logical node located on a single physical node or on a plurality of different physical nodes. The server 12 executes the mobile OS (e.g., Google's Android or Microsoft's Windows Phone Mobile) and the applications (e.g., a game, web-browsing or GPS navigation program) for the mobile device 10 in a virtual machine (e.g., the virtual machine may be implemented using Oracle Virtual Box or VMware Player over Linux OS) and emulates mobile device HW to the mobile OS based on the input information received from the mobile device 10. For example, the server 12 receives the input information (e.g., sensor changes, key and touch screen input, audio data, video data, etc.) from the mobile device 10, decodes the input information (decoding audio, picture and video data and messages containing the sensor changes and screen input), and processes the input information by the emulated HW and the mobile OS and/or applications executing on the emulated HW. The server 12 thus emulates a user experience including the user interface and changes thereto.

The OS on a conventional mobile device configures the HW using SW drivers of the mobile device. If there is feedback from the HW, processing of the feedback is performed through the SW drivers on the conventional mobile device. In contrast, the server 12 according to example embodiments emulates mobile device HW on the server side. The HW drivers are rewritten for server 12 to enable interaction with the mobile OS on the server 12 based on the input information mirrored from the mobile device 10. For example, if the mobile OS on the server 12 attempts to send a packet over the internet using WiFi, an emulated WiFi driver at the server 12 accesses the server's Ethernet card HW and sends the packet through the HW Ethernet card. If the mobile OS on the server 12 receives input information to draw a circle on a display using GPU drivers, an emulated GPU driver at the server 12 processes the input information to draw the circle, stores the results in server memory, emulates the resulting display and sends user interface information for reproducing the resulting display toward mobile device 10. If the mobile OS on the server attempts to send audio data to audio speaker drivers, an emulated audio speaker driver at the server 12 packages the audio data and sends the audio data to the mobile device 10 for reproduction. An emulated touch screen driver on the server 12 receives input information (e.g., coordinates) from the mobile device 10, converts the input information and emulates the touch screen driver toward the mobile OS. The mobile OS uses the input information to run the application and change the display accordingly, and the emulated display information is sent toward the mobile device 10.

A server-to-client protocol at the server 12 separates the emulated user experience, i.e., the user interface data resulting from processing of the input information by the mobile OS and/or applications at the server 12, into different data streams including video, image, audio, notifications and text data streams. The video, image and text data may be separated into individual streams by an identification unit configured to identify the video, image and text data in one or more streams of display data output from a hardware emulation of the display. The server 12 sends, e.g., streams, each type of data independently to the mobile device 10 in a separate stream. Each individual data stream has its own characteristics, for example, an encoding method for efficient bandwidth (BW) utilization (e.g., Lossy vs. Lossless encoding), a quality of service (QoS), a bandwidth etc., which may be different from stream to stream. Intensive processing tasks, for example, encoding/decoding of video, may be accelerated by HW at the server 12.

VoIP protocols (e.g., session initiation protocol (SIP) and real-time transport protocol (RTP)) at the server 12 provide internal network telephone calls. The server 12 further comprises a gateway to a public switched telephone network (PSTN) for telephone calls external to the network. The server 12 comprises a gateway to the Internet for data related functionality (e.g., web surfing, e-mails, network gaming, network storage, etc.). The server 12 comprises local storage for relevant user data (applications, movies, pictures, files, etc.) and emulates storage HW for the mobile OS. The server is configured to send notifications of new events (e.g., a telephone call, a new E-mail, a new SMS etc. . . . ) to mobile device 10.

Figure 6A:
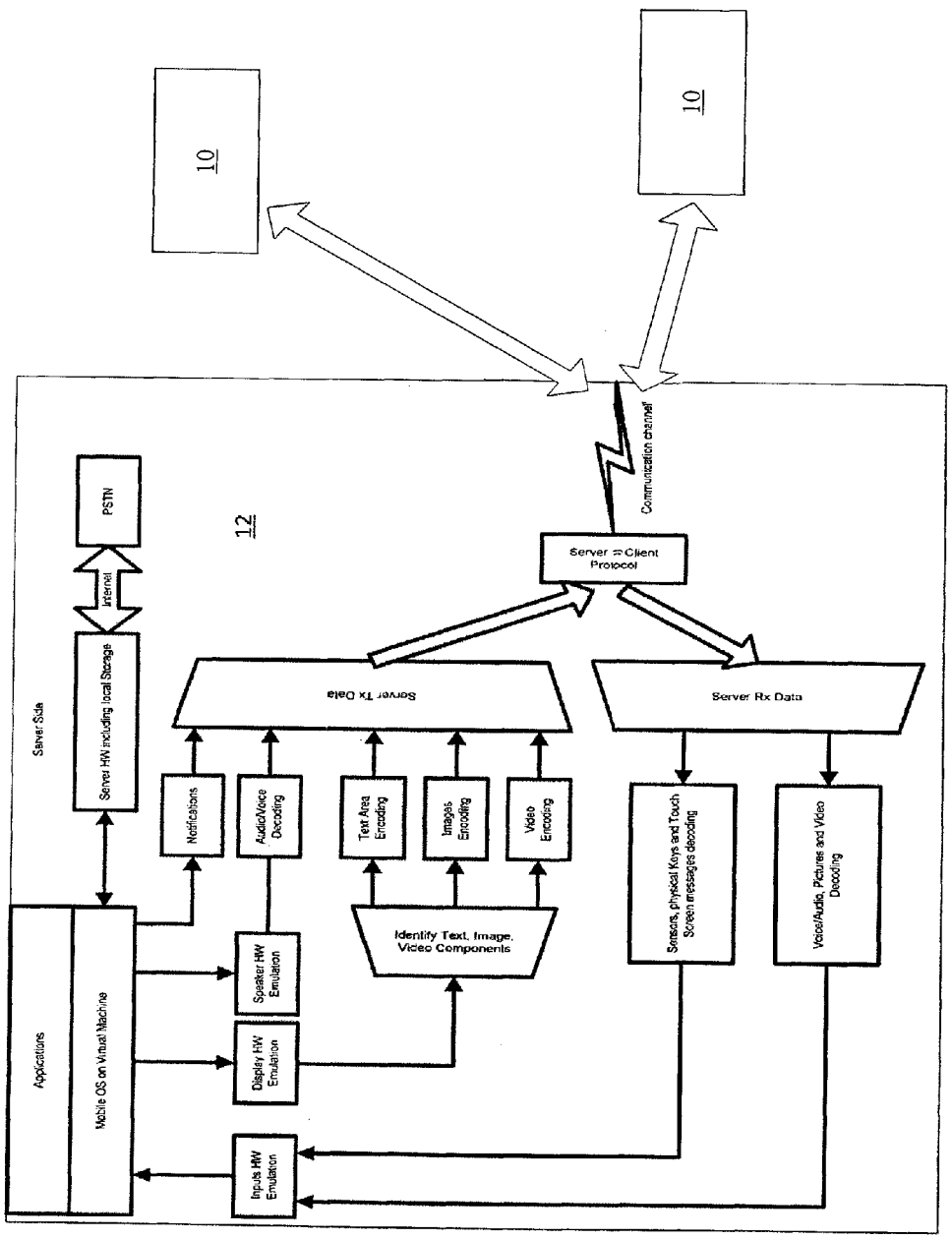
FIG. 6 is a block diagram of system components and functionality for a system comprising a server and a plurality of mobile devices according to an example embodiment.
Figure 6B:
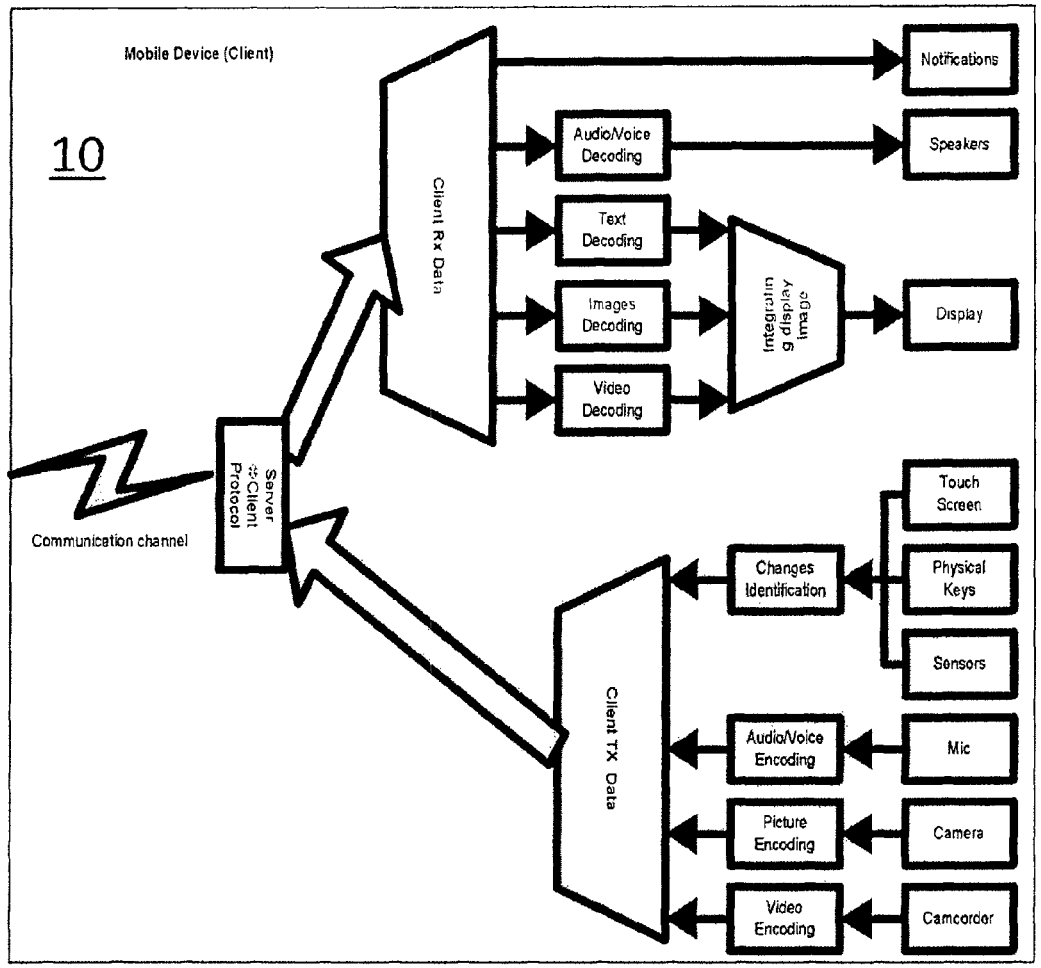

FIG. 6 is a block diagram of system components and functionality of a system comprising a server and a plurality of mobile devices according to an example embodiment. The server 12 communicates with the mobile devices 10 in a stateless manner such that if there is a connection failure between the server 12 and one or more of the mobile devices 10, functionality/communication is halted and, when a connection is reestablished, functionality/communication continues from the same point. Each different type of data (e.g., voice, audio, image, video, notification, sensor, etc.) is sent between the server 12 and the mobile devices 10 in a separate stream. For example, audio data is sent from the server 12 to the mobile devices 10 (and vice-versa) in a first stream separate and different from a second stream in which video data is sent. Each stream comprises its own individual characteristics, which may be different from stream to stream. For example, each stream has an encoding/decoding type, a quality of service (QoS) and a bandwidth which may be different for each stream. For example, a maximum bandwidth is set low enough that use of the mobile device 10 and server 12 according to example embodiments is practical, and if there is no need for a high bandwidth, bandwidth is not unnecessarily consumed by the mobile device 10 and server 12. Each individual stream of data may have a different QoS so that a quality of experience (QoE) is optimal even if BW is lacking. For example, voice and sensor data streams may typically have a higher QoS level than video data streams so that a user receives high quality calls and senses minimal lag of the user interface.

The mobile device 10 and server 12 may be configured to achieve minimal latency for user interface related messages and data stream encoding. For example, a user should not feel that the mobile device 10 behaves differently from a conventional mobile device in which functionality is executed locally. Furthermore, the mobile device 10 selects streaming characteristics to maintain power dissipation efficiency similar to that of a conventional mobile device. QoS (e.g., QOS may be implemented using Layer 2 Vlan 0.1P bits or Layer3 DSCP bits) and an encoding type may be set based on a type of the stream. For example, a video stream may receive H.264 encoding/decoding and a lowest level QoS. A voice stream may receive lossless encoding and a higher level of QoS. Bandwidth (BW) may be automatically calculated based on a bandwidth required for the type of stream. For example, a high-definition (HD) video stream may receive a higher BW, e.g., 10 Mb/s, a lower quality video stream may receive a lower BW, e.g., 1 Mb/s, and a voice stream may receive an even lower BW, e.g., 64 Kb/s. The server-to-client protocol at the mobile device 10 and the server 12 determines the streaming characteristics.

The server 12 is configured to support multiple mobile devices 10 using the same user instance. That is, a plurality of different mobile devices 10 may send input information to and receive user interface information from the same instance of an OS executed by the server 12. For example, a user may use a plurality of different mobile devices, e.g., a smartphone, a tablet, and a streamer, simultaneously on the same user instance.

The server 12 is configured to support a plurality of different mobile device users with each user using a different mobile OS or OS version. For example, the server 12 may emulate mobile device hardware for a first device manufactured by Samsung and executing Google's Android OS, and emulate mobile device hardware for a second device manufactured by Nokia and executing Google's Android OS. The server is configured to handle a high scale of users, i.e., mobile devices 10, simultaneously without suffering degradation in performance.

Each data stream sent between the server 12 and a mobile device 10 may be encrypted end-to-end using transport layer security/secure sockets layer (TLS/SSL) or other encryption protocols.

Cloud based servers and/or content delivery networks connect the mobile device 10 to the closest server 12 (or to the server 12 providing the best connection or bandwidth for the mobile device 10) so that there is minimal latency and maximum BW when the mobile device is roaming. A "cloud network" manages data synchronization between servers.

The server 12 continuously analyzes display data/user interface information that is to be sent from server 12 the mobile device 10. The display may be separated into different areas by the server 12, each with different characteristics. The server 12 identifies changing picture areas in the display data as video, applies Lossy encoding to the video and streams the encoded video to the mobile device 10. The server 12 identifies static picture areas in the display data as images, applies Lossy encoding to the images and streams the encoded images to the mobile device 10. The server 12 identifies static bi-color areas in the display data as text, applies Lossless image compression to the text and streams the compressed text to the mobile device 10. The server 12 processes and sends compressed audio to the mobile device 10 as a separate stream. Because audio and voice streams receive higher QoS than video streams, and assuming there is enough network BW, a sufficiently low latency for audio and voice data is maintained so that insignificant skew between video and audio playback occurs. For example, a video latency of 100 ms and an audio latency of 50 ms should not result in a skew between video and audio playback that is noticeable by the user.

Server-to-client BW is used adaptively, and the sever-to-client protocol at the mobile device 10 and the server 12 continuously measures the available BW. When more BW is available a higher quality display (typically video) is transferred.

The mobile device 10 decodes and assembles the separate video, image and text data streams of the display data/user interface data into a display. The mobile device 10 enables different HW operations or actions according to requests from the sever 12. For example, the mobile device 10 enables the camera and/or microphone in response to a request from the server 12. The mobile device 10 decodes the compressed audio of the user interface data and reproduces the audio at the speaker in coordination with the assembled display.

The mobile device 10 sends user interface operations, e.g., touch screen, keyboard, button operations, etc., to the server 12 as the input information. The mobile device 10 may send only changes to the user interface to the server 12 so that bandwidth is used efficiently. For example, if the user presses a button on the mobile device 10, the mobile device 10 sends a single button pressed message, even if the user continues to press the button. When the user releases the button, the mobile device 10 sends a button released message to the server 12.

The mobile device 10 compresses camcorder video, camera pictures and audio detected by the microphone and sends the compressed data to the server 12. The server-to-client protocol at the mobile device 10 and the server 12 is executed over encrypted transport layers.

Figure 7:
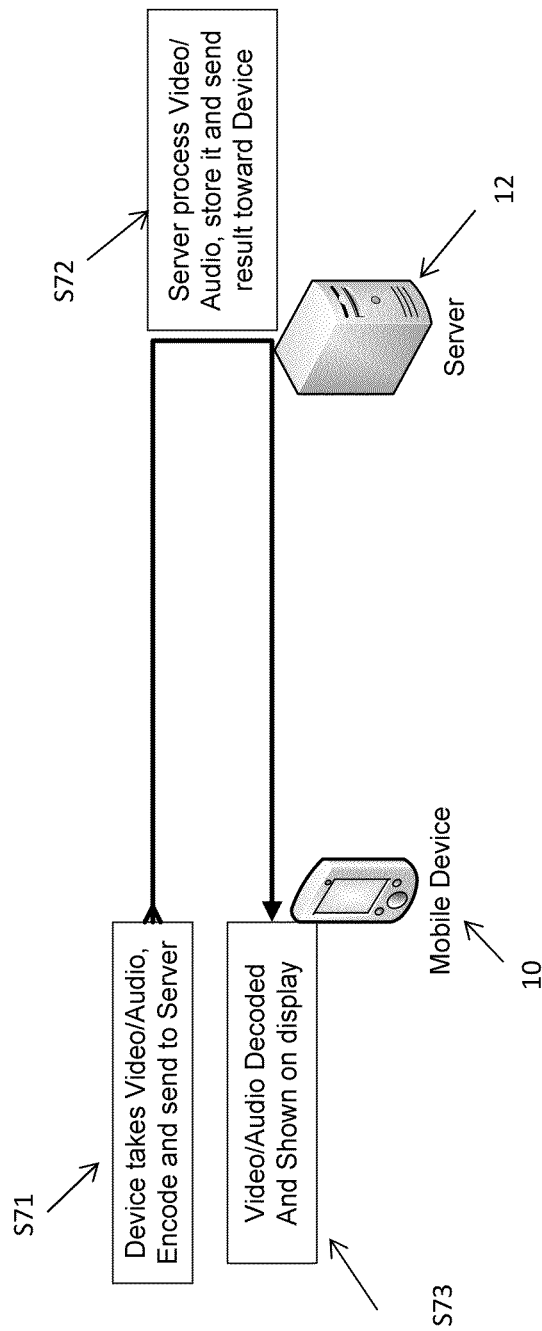
FIG. 7 is a flow diagram illustrating a system and method according to an example embodiment.

FIG. 7 is a flow diagram illustrating a system and method according to an example embodiment. For example, an example embodiment provides for taking video. A mobile device 10 receives and/or creates audio and/or video data (e.g., by taking a video), encodes the audio/video data and sends the encoded audio/video data (each type of data being sent in a different data stream) to the server 12 at S71. For example, the camera/camcorder of the mobile device may record video data and the microphone may record corresponding audio data for the video. The server 12 decodes the audio/video data, processes and stores the audio/video data by the emulated HW and OS at the server 12 and sends (and encodes) the result of the processing to the mobile device 10 at S72 (each type of data being sent in a different data stream). For example, the server 12 processes the audio/video data to edit the video, e.g., to cut and swap video portions, add titles, etc. As another example, game applications may process the audio/video data to add it to graphics in real time. The mobile device 10 decodes the processed audio/video data from each stream, integrates the data from the separate streams together to produce a display and displays the result and reproduces the audio to the user at S73.

Figure 8:
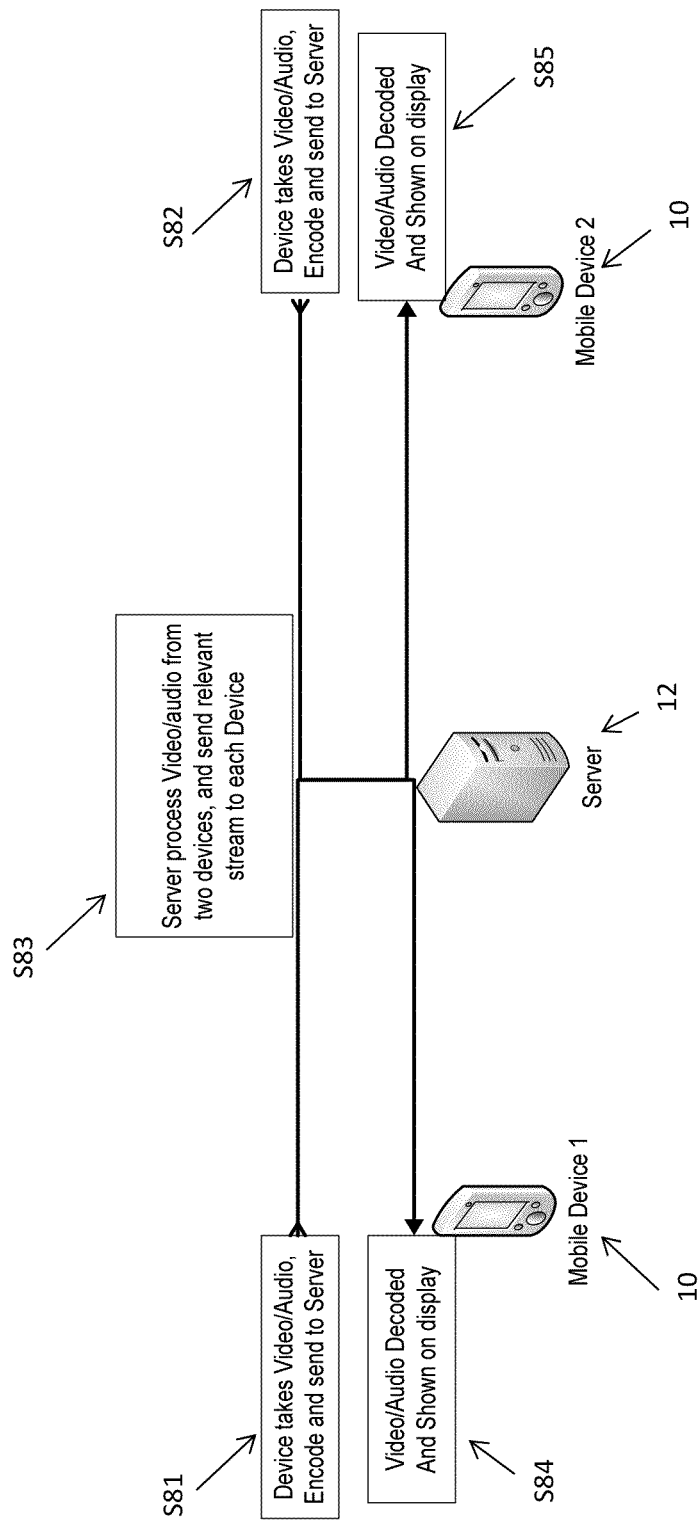
FIG. 8 is a flow diagram illustrating a system and method according to another example embodiment.

FIG. 8 is a flow diagram illustrating a system and method according to another example embodiment. For example, an example embodiment provides for a video or VoIP call. A first mobile device 10 receives and/or creates audio and/or video data, encodes the audio/video data and sends the encoded audio/video (each type of data being sent in a different data stream) to a server 12 at S81. A second mobile device 10 receives and/or creates audio and/or video data, encodes the audio/video data and sends the encoded/audio/video (each type of data being sent in a different data stream) to the server 12 at S82. Steps S81 and S82 may occur in the order described, in an opposite order or simultaneously. For example, the audio/video data sent from each of the mobile devices 10 may be data for a video or VoIP call between the first and second mobile devices 10, and the server 12 may receive audio/video data from each device simultaneously as the call is ongoing. The server 12 processes the audio/video data from the first mobile device 10 and the audio/video data from the second mobile device 10 and sends (and encodes) the processed data to the first and second mobile devices 10 at S83. For example, the server 12 mergers the video from the first mobile device 10 with the video from the second mobile device 10 so that each user can see their own picture and the picture of the other user. The first and second mobile devices 10 receive the processed audio/video streams, decode the processed audio/video data from each stream, integrate the data from the separate streams to produce a display and display the results and reproduce the audio to the user at steps S84 and S85.

Figure 9:
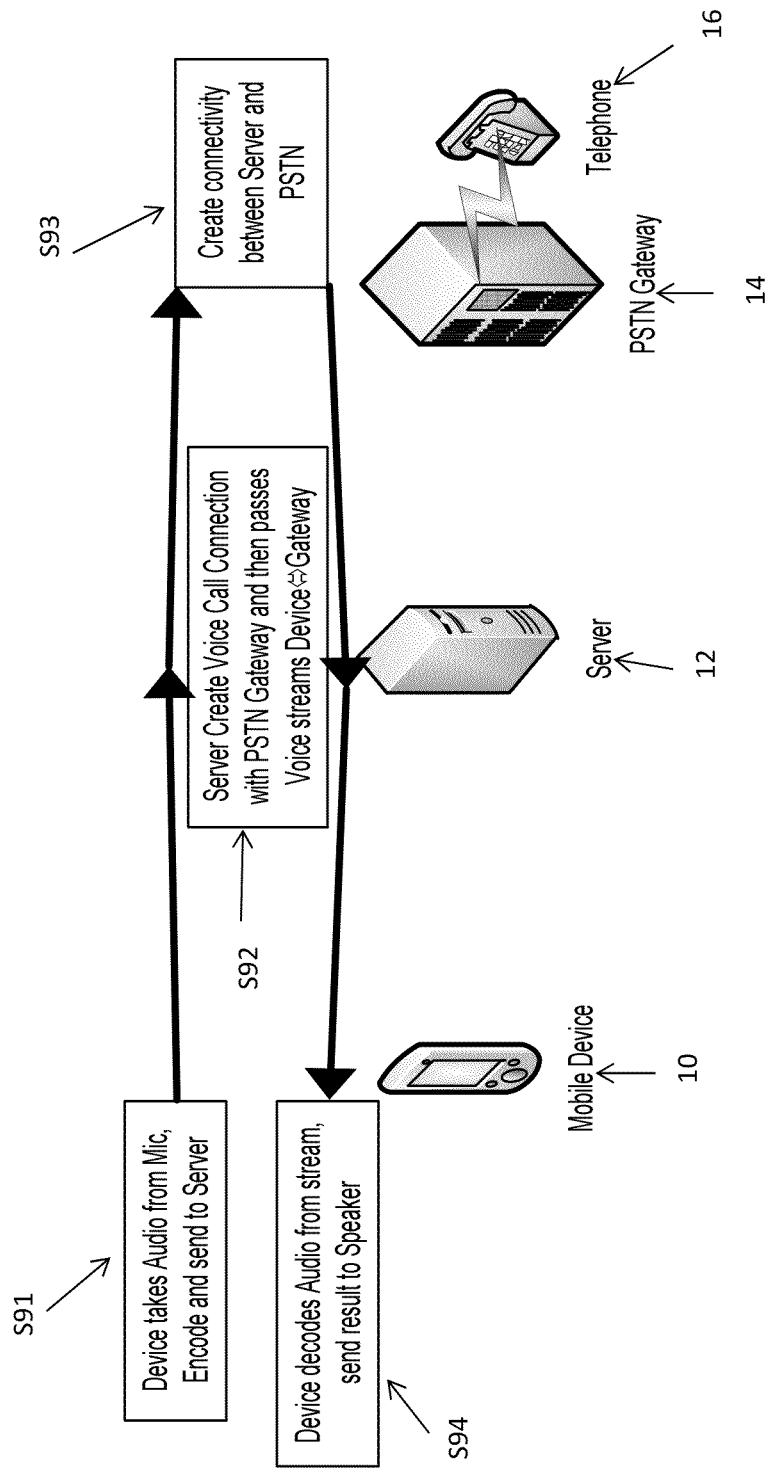
FIG. 9 is a flow diagram illustrating a system and method according to still another example embodiment.

FIG. 9 is a flow diagram illustrating a system and method according to still another example embodiment. For example, an example embodiment provides for a telephone call to a telephone on a PSTN. A mobile device 10 receives and/or creates audio data, e.g., from a microphone, encodes the audio data and sends the encoded audio data to a server 12 at S91. The server 12 creates a voice call connection with a PSTN gateway 14 and is configured to pass voice streams including audio data between the mobile device 10 and the gateway 14 at S92. The PSTN gateway 14 creates a connection between the server 12 and a PSTN at S93, and the PSTN gateway 14 connects at least one PSTN telephone 16 in the PSTN for the voice call connection. The mobile device 10 decodes audio data sent from the server 12 in the voice streams and sends the result to a speaker of the mobile device 10 at S94.

Figure 10:
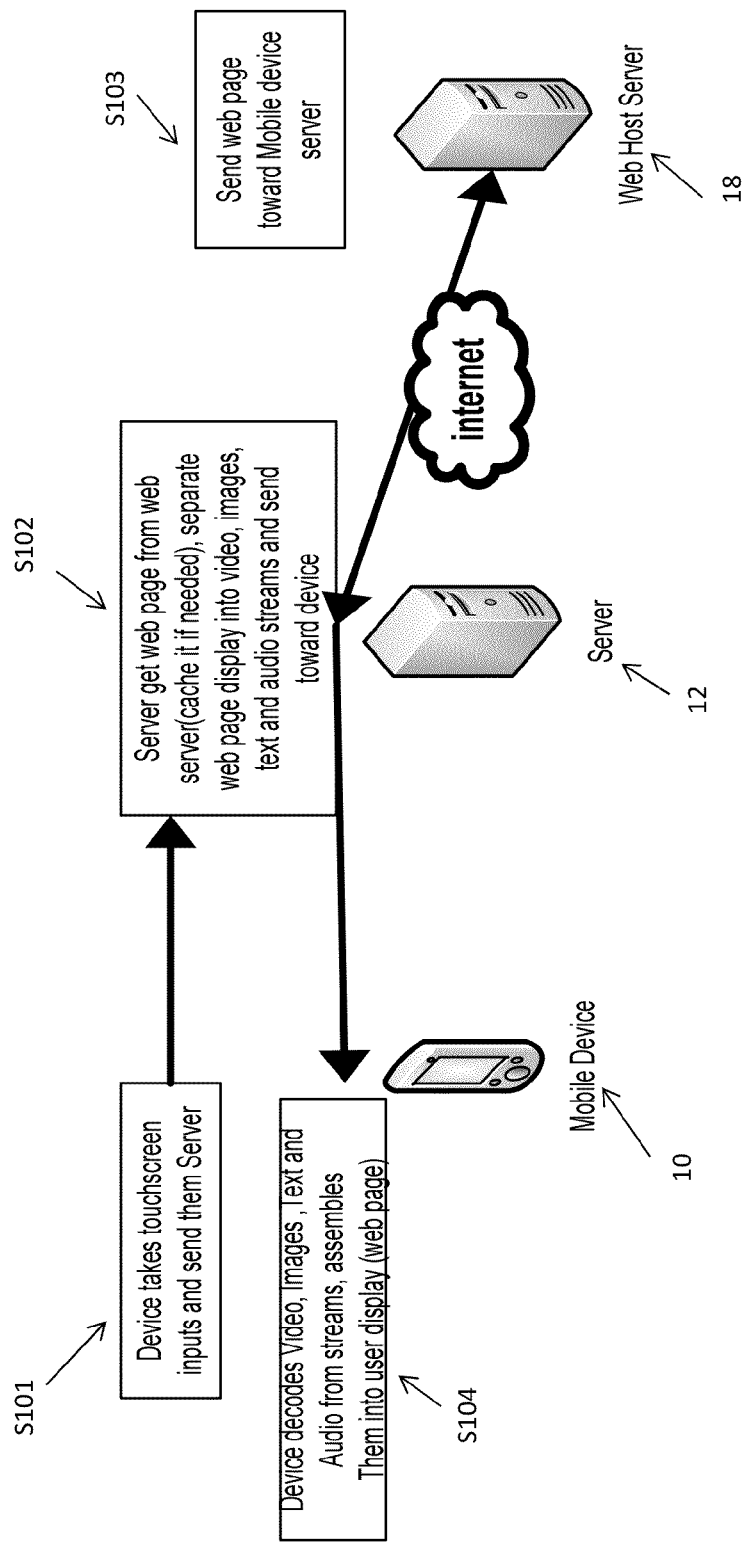
FIG. 10 is a flow diagram illustrating a system and method according to an example embodiment.

FIG. 10 is a flow diagram illustrating a system and method according to an example embodiment. For example, an example embodiment provides for web surfing. A mobile device 10 receives touchscreen inputs (or other input data) and sends the input information to a server 12 at S101. For example, the input information may comprise information requesting a web page, e.g., a URL. The server 12 requests a web page from a web server 18 at S102 in response to the input information from the mobile device 10. The web server 18 sends the web page to the server 12 at S103 in response to the request from the server 12. The server 12 receives the web page from the web server 18 (and caches the web page if needed or desired), separates the web page display into video, image, text and audio streams and sends the web page to the mobile device. For example, the server 12 executes a browser application that produces display data for the web page and sends the display data to the mobile device 10 as user interface data. The mobile device decodes the user interface data including video, image, text and/or audio data from the respective streams and assembles the decoded video, image, text and audio data together to produce a user display with audio (i.e., the web page) at S104.

Figure 11:
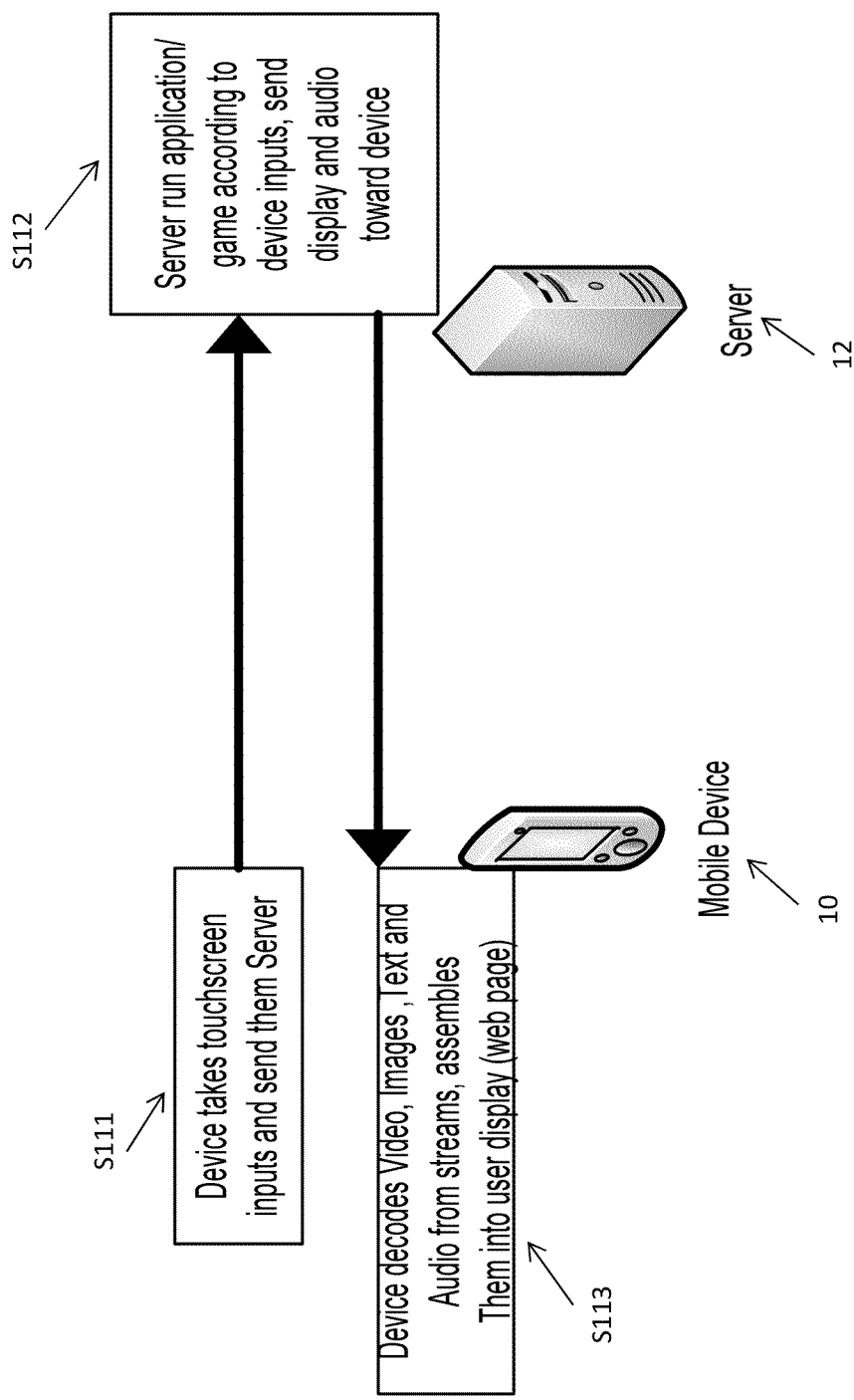
FIG. 11 is a flow diagram illustrating a system and method according to another example embodiment.

FIG. 11 is a flow diagram illustrating a system and method according to another example embodiment. For example, an example embodiment provides for running a game application. A mobile device 10 receives touchscreen inputs (or other inputs) and sends the input information to a server at S111. The server 12 executes an application, e.g., a game, on a mobile OS running on mobile device HW emulated on the server 12 based on the input information received and sent by the mobile device 10, and sends user interface information including display data and audio data to the mobile device 10 at S112. The mobile OS and emulated mobile device HW run on top of a normal OS of the server 12. The mobile device 10 receives the display and audio data and decodes video, image, text and audio data from the respective streams and assembles the data together into a user display with audio at S113.

Figure 12:
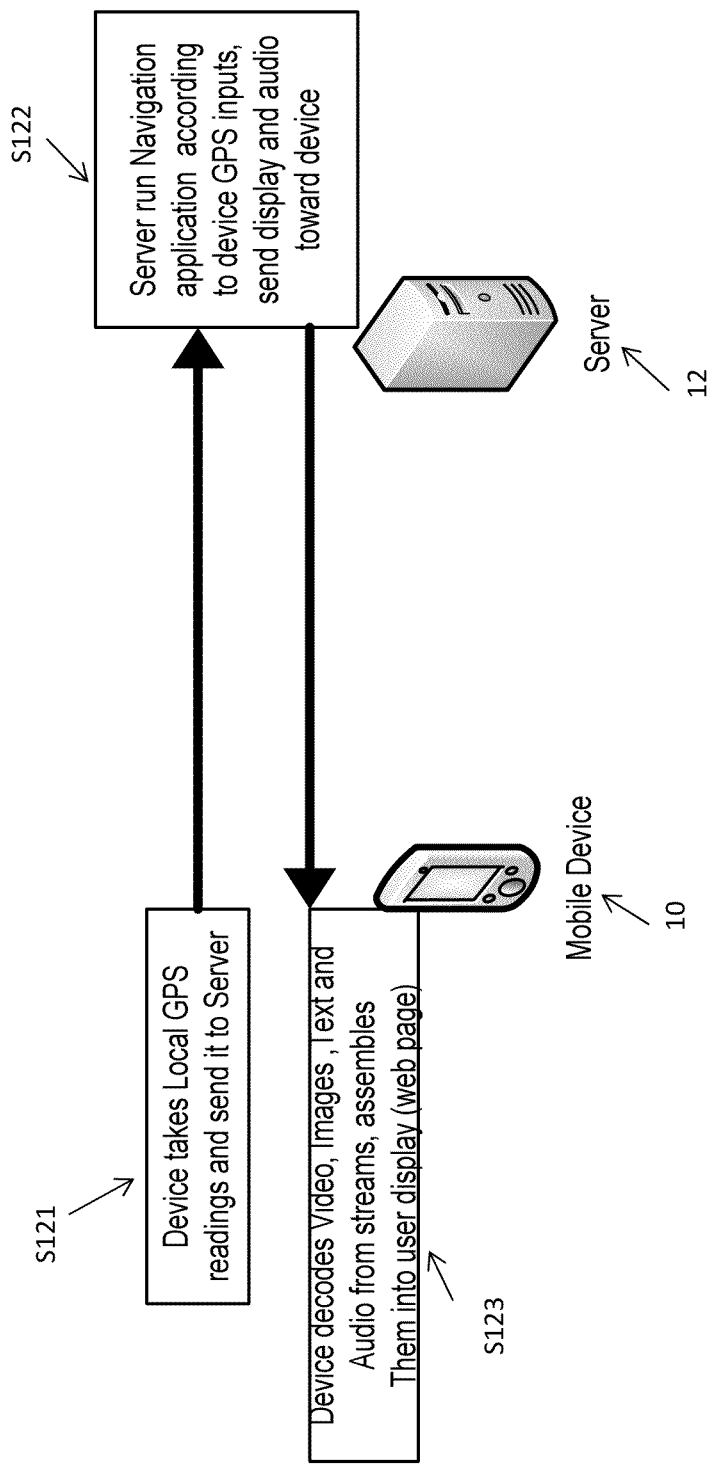
FIG. 12 is a flow diagram illustrating a system and method according to still another example embodiment.

FIG. 12 is a flow diagram illustrating a system and method according to still another example embodiment. For example, an example embodiment provides for navigation with a GPS. A mobile device 10 takes local GPS readings and sends the GPS readings to a server 12 at S121. The server 12 executes a navigation application on a main OS running on mobile device HW emulated on the server 12 according to the GPS readings sent by the mobile device 10 and sends user interface information including display data and/or audio data corresponding to an display or output of the navigation application to the mobile device 10 at S122. The mobile device 10 decodes the display data and the audio data from the respective streams and assembles the display data together into a user display with audio at S123.

Systems and methods according to example embodiments allow for more widespread manufacture and implementation of lower cost and simpler mobile devices (e.g., mobile devices with lower CPU power and memory sizes) because mobile device performance and capabilities are not dependent on the HW of the mobile device itself but, rather, on server capabilities. Accordingly, a mobile device having a lower HW cost can provide a user with the experience of a high performance mobile device that costs significantly more to manufacture. Furthermore, mobile device HW and functionality is agnostic to the OS used and, therefore, OS upgrades and changes may be more easily performed. User data and history is stored and backed-up centrally on the server side so that if the mobile device fails or is lost, user data and history can be easily recovered. A user (or multiple users) may use a plurality of different mobile devices (e.g., a smartphone, a tablet, etc.) with the same OS instance, thereby avoiding any need to pass data between different user mobile devices, reinstall applications, etc. For example, a user may own several different devise, e.g., a cellular phone, a tablet, etc., and the user may use the same OS instance on the server 12 for each device. Accordingly, all of the user's applications, pictures, data, contacts, etc. are synched to each of the devices automatically by the shared OS instance. The user thus does not need to install the same application separately on each device, or move pictures taken by the cellular phone to the tablet. The number of mobile device variants (e.g., different phone models) may be reduced because only physical interfaces (e.g., display, sensors, camera, and camcorder) are required to be permanently configured for the end user. A large number of mobile device variants based on different memory size, CPU power, etc. are therefore no longer required. Moreover, the simplicity of the SW on the mobile device allows for mobile device vendors to reduce design efforts and cost, as well as perform less future maintenance.

Although example embodiments have been shown and described in this specification and figures, those skilled in the art will appreciate that various changes may be made to the illustrated and/or described example embodiments without departing from the principles, spirit, and scope of the invention defined by the following claims.

What is claimed is:

1. A method for emulating a mobile device at a server, the method comprising:
   receiving, by the server, input information from at least one mobile device, wherein the input information has not been processed to produce a display, audio and a hardware (HW) action by a HW component of the mobile device;
   processing, by a mobile device operating system (OS) executed at the server, the input information to produce a stream of user interface information for use in reproducing at the mobile device at least one of the display, the audio and the hardware (HW) action by the HW component of the mobile device based on a same instance of the mobile device operating system; and
   sending, by the server, the stream of user interface information to the mobile device to reproduce at the mobile device at least one of the display, the audio and the HW action by the HW component of the mobile device.

2. The method of claim 1, further comprising:
   emulating, by the server, mobile device HW and executing the mobile device OS on the emulated mobile device HW.

3. The method of claim 1, further comprising:
   executing, by the server, at least one application on the mobile OS;
   wherein the at least one application processes the input information to produce the stream of user interface information.

4. The method of claim 1, further comprising:
   providing, by the server, a mobile device gateway for handling and providing internet access, voice calls and a gateway to a public switched telephone network (PSTN).

5. The method of claim 1, further comprising:
   receiving, by the server, the input information from a plurality of different mobile devices, wherein a same instance of the mobile device OS processes the input information from each of the plurality of different mobile devices to produce the stream of user interface information.

6. The method of claim 1, wherein the stream of user interface information comprises a plurality of different types of data and the server sends each different type of data to the mobile device in a separate data stream.

7. The method of claim 6, wherein at least one of said separate data streams comprises a quality of service different from a quality of service of another of said separate data streams.

8. The method of claim 6, wherein at least one of said separate data streams comprises an encoding method and a bandwidth different from an encoding method and a bandwidth of another of said separate data streams.

9. The method of claim 6, wherein the input information is processed by the mobile device OS executed at the server to produce the stream of user interface information for reproducing the display, the processing separating the display into a plurality of different areas, the processing identifying changing picture areas in display data of the stream of user interface information as video data, the processing identifying static picture areas in the display data of the stream of user interface information as image data and the processing identifying static bi-color areas in the display data of the stream of user interface information as text data.

10. The method of claim 1, wherein the input information is received by the server as a plurality of separate data streams, each of said plurality of separate data streams of the input information comprising a different type of data.

11. A method for emulating a mobile device at a server, the method comprising:
    receiving, by the server, input information from at least one mobile device;
    processing, by a mobile device operating system (OS) executed at the server, the input information to produce a stream of user interface information for use in reproducing at the mobile device at least one of a display, audio and a hardware (HW) action by a HW component of the mobile device based on a same instance of the mobile device OS; and
    sending, by the server, the stream of user interface information to the mobile device, wherein the stream of user interface information from the same instance of the mobile device OS comprises a plurality of different types of data and the server sends each different type of data to the mobile device in a separate data stream for reproduction on the mobile device of at least one of the display, audio and the HW action by the HW component of the mobile device.

12. The method of claim 11, further comprising:
    emulating, by the server, mobile device HW and executing the mobile device OS on the emulated mobile device HW.

13. The method of claim 11, further comprising:
    executing, by the server, at least one application on the mobile device OS;

wherein the at least one application processes the input information to produce the stream of user interface information.

14. The method of claim 11, further comprising:
providing, by the server, a mobile device gateway for handling and providing internet access, voice calls and a gateway to a public switched telephone network (PSTN).

15. The method of claim 11, further comprising:
receiving the input information from a plurality of different mobile devices, wherein a same instance of the mobile device OS processes the input information from the plurality of different mobile devices to produce the stream of user interface information.

16. The method of claim 11, wherein at least one of said separate data streams comprises a quality of service different from a quality of service of another of said separate data streams.

17. The method of claim 11, wherein at least one of said separate data streams comprises an encoding method and a bandwidth different from an encoding method and a bandwidth of another of said separate data streams.

18. The method of claim 16, wherein the input information is processed to produce the stream of user interface information for reproducing the display, the processing separating the display into a plurality of different display areas, the processing identifying changing picture areas in display data of the stream of user interface information as video data, the processing identifying static picture areas in the display data of the stream of user interface information as image data and the processing identifying static bi-color areas in the display data of the stream of user interface information as text data.

19. The method of claim 11, wherein the input information is received by the server as a plurality of separate data streams, each of said plurality of separate data streams of the input information comprising a different type of data.

20. A method for emulating a mobile device at a server, the method comprising:
receiving, by the server, input information from a plurality of different mobile devices, wherein the input information has not been processed to produce a display, audio and a hardware (HW) action by a corresponding HW component of the mobile devices;
processing, by a same instance of a mobile device operating system (OS) executed at the server, the input information from each of the plurality of different mobile devices to produce user interface information for use in reproducing at the different mobile devices at least one of the display, audio and the HW action by the HW components of the different mobile device based on the same instance of the mobile device OS; and
sending, by the server, the user interface information to at least one of the plurality of different mobile devices.

21. The method of claim 20, further comprising:
executing, by the server, at least one application on the mobile device OS;
wherein the at least one application processes the input information to produce the user interface information.

22. The method of claim 20, further comprising:
providing, by the server, a mobile device gateway for handling and providing internet access, voice calls and a gateway to a public switched telephone network (PSTN).

23. The method of claim 20, wherein the stream of user interface information comprises a plurality of different types of data and the server sends each different type of data to the mobile device in a separate data stream.

24. The method of claim 23, wherein at least one of said separate data streams comprises a quality of service different a quality of service of another of said separate data streams.

25. The method of claim 23, wherein at least one of said separate data streams comprises an encoding method and a bandwidth different from an encoding method and a bandwidth of another of said separate data streams.

26. The method of claim 23, wherein the input information is processed by the mobile device OS executed at the server to produce the stream of user interface information for reproducing the display, the processing separating the display into a plurality of different areas, the processing identifying changing picture areas in display data of the stream of user interface information as video data, the processing identifying static picture areas in the display data of the stream of user interface information as image data and the processing identifying static bi-color areas in the display data of the stream of user interface information as text data.

27. The method of claim 20, wherein the input information is received by the server as a plurality of separate data streams, each of said plurality of separate data streams comprising a different type of data.

28. A method for emulating a mobile device at a server, the method comprising:
receiving, by server, first input information from a mobile device;
processing, by a first mobile device operating system (OS) executed at the server, the first input information to produce a first stream of user interface information for use in reproducing at the mobile device at least one of a display, audio and a hardware (HW) action by a HW component of the mobile device; and
sending, by the server, the first stream of user interface information to the mobile device to reproduce on the mobile device at least one of the display, audio and the HW action by the HW component of the mobile device;
receiving, by the server, second input information from the mobile device;
processing, by a second mobile device operating system (OS) executed by the server, the second input information to produce a second stream of user interface information for reproducing at least one of a display, audio and a HW action by a HW component of the mobile device, wherein the second mobile device OS has at least one of a different OS type, a different OS version and a different OS instance than the first mobile device OS; and
sending, by the server, the second stream of user interface information to the mobile device to reproduce on the mobile device at least one of the display, audio and the HW action by the HW component of the mobile device.

* * * * *